US009003935B2

(12) United States Patent
Herlinger et al.

(10) Patent No.: US 9,003,935 B2
(45) Date of Patent: Apr. 14, 2015

(54) CUTTING DEVICE AND CUTTING METHOD FOR CUTTING LABELS, AND LABELLING APPARATUS

(75) Inventors: Juergen Herlinger, Regensburg (DE); Michael Utz, Hemau (DE)

(73) Assignee: Krones AG (DE)

( * ) Notice: Subject to any disclaimer, the term of this patent is extended or adjusted under 35 U.S.C. 154(b) by 264 days.

(21) Appl. No.: 12/845,495

(22) Filed: Jul. 28, 2010

(65) Prior Publication Data

US 2011/0023671 A1 Feb. 3, 2011

(30) Foreign Application Priority Data

Jul. 29, 2009 (DE) ......................... 10 2009 035 269

(51) Int. Cl.

| | |
|---|---|
| ***B23D 25/02*** | (2006.01) |
| ***B26D 7/26*** | (2006.01) |
| ***B23D 25/00*** | (2006.01) |
| ***B26D 1/56*** | (2006.01) |
| ***B65C 9/18*** | (2006.01) |
| ***B26D 1/40*** | (2006.01) |
| ***B26D 7/01*** | (2006.01) |
| ***B26D 7/20*** | (2006.01) |

(Continued)

(52) U.S. Cl.

CPC ................ *B65C 9/1803* (2013.01); *B26F 1/44* (2013.01); *B65C 2009/1838* (2013.01); *B26D 1/405* (2013.01); *B26D 5/20* (2013.01); *B26D 7/018* (2013.01); *B26D 7/204* (2013.01)

(58) Field of Classification Search

CPC ........ B41J 11/663; B41J 11/70; B31D 1/021; B32B 2309/14; B26F 1/44

USPC ............... 83/37, 348, 298, 337, 171, 342, 23; 156/510, 250, 516, 518; 221/71, 73

See application file for complete search history.

(56) References Cited

U.S. PATENT DOCUMENTS

| | | | | |
|---|---|---|---|---|
| 3,565,724 A | | 2/1971 | Yamaguchi | 156/354 |
| 3,577,293 A | * | 5/1971 | Ritterhoff | 156/156 |
| 3,618,483 A | * | 11/1971 | Helm | 493/345 |

(Continued)

FOREIGN PATENT DOCUMENTS

| | | | |
|---|---|---|---|
| DE | 20 2005 002 793 | 5/2005 | B65C 3/16 |
| DE | 202007001964 | 5/2007 | B65C 9/18 |

(Continued)

OTHER PUBLICATIONS

Chinese Office Action issued in corresponding application No. 2010102453050, received Sep. 6, 2012 (2 pgs).

(Continued)

*Primary Examiner* — Ghassem Alie
*Assistant Examiner* — Bharat C Patel
(74) *Attorney, Agent, or Firm* — Hayes Soloway P.C.

(57) ABSTRACT

A cutting device for cutting labels includes a cutting element for cutting into individual labels a label strip that is provided with a plurality of labels arranged one behind the other in the direction of the length of the label strip. The cutting element has a cutting tool in a first axis, about which the cutting element is rotatable. A counter-pressure roller which serves for the placement of the label strip is rotatable about a second axis arranged parallel to the first axis and has at least one counter-cutting bar which is provided on the outer surface of the counter-pressure roller essentially parallel to the second axis.

14 Claims, 5 Drawing Sheets

(51) Int. Cl.
*B26F 1/44* (2006.01)
*B26D 5/20* (2006.01)

(56) References Cited

U.S. PATENT DOCUMENTS

| | | | | |
|---|---|---|---|---|
| 3,957,570 | A * | 5/1976 | Helm | 156/519 |
| 4,108,710 | A * | 8/1978 | Hoffmann | 156/450 |
| 4,671,843 | A * | 6/1987 | Olsen | 156/450 |
| 5,363,728 | A * | 11/1994 | Elsner et al. | 83/23 |
| 5,413,651 | A | 5/1995 | Otruba | 156/64 |
| 5,692,440 | A * | 12/1997 | Hillebrand | 101/226 |
| 5,741,381 | A * | 4/1998 | Dolence et al. | 156/64 |
| 5,821,724 | A * | 10/1998 | Hinton | 318/798 |
| 5,863,382 | A * | 1/1999 | Hinton | 156/510 |
| 6,044,887 | A * | 4/2000 | Orlandi et al. | 156/521 |
| 6,149,755 | A * | 11/2000 | McNichols et al. | 156/264 |
| 6,294,038 | B1 * | 9/2001 | Majkrzak | 156/238 |
| 6,328,832 | B1 * | 12/2001 | Otruba et al. | 156/64 |
| 6,604,623 | B2 * | 8/2003 | Sumi et al. | 198/377.08 |
| 6,658,975 | B2 * | 12/2003 | Schinelli | 83/171 |
| 7,005,028 | B2 * | 2/2006 | Middelstadt et al. | 156/264 |
| 7,172,666 | B2 * | 2/2007 | Groves et al. | 156/64 |
| 2001/0017181 | A1 | 8/2001 | Otruba et al. | 156/64 |
| 2002/0029856 | A1 | 3/2002 | Gonzalo | 156/517 |
| 2002/0184985 | A1 * | 12/2002 | Ishibuchi et al. | 83/342 |
| 2003/0121381 | A1 * | 7/2003 | Buta | 83/37 |
| 2004/0250706 | A1 * | 12/2004 | De Matteis | 100/121 |
| 2006/0048417 | A1 * | 3/2006 | Leykamm | 40/310 |
| 2006/0124231 | A1 * | 6/2006 | Nonoyama et al. | 156/250 |
| 2009/0071608 | A1 | 3/2009 | Thomas et al. | 156/516 |
| 2009/0078363 | A1 | 3/2009 | Kramer et al. | 156/230 |

FOREIGN PATENT DOCUMENTS

| | | | |
|---|---|---|---|
| EP | 2 042 437 | 1/2009 | B65C 9/18 |
| JP | 3-113798 | 11/1991 | B26D 1/40 |
| JP | 04-057729 | 2/1992 | B65C 3/12 |
| JP | 7-35750 | 8/1995 | B26D 1/40 |
| JP | 2008-221429 | 9/2008 | B65D 1/40 |
| WO | WO 9710953 | 3/1997 | B32B 31/00 |
| WO | WO 98/19916 | 5/1998 | B65C 9/18 |
| WO | WO 2007/110199 | 10/2007 | B65C 9/18 |

OTHER PUBLICATIONS

Decision of Rejection issued in corresponding Chinese Patent Appln. Serial No. 201010245305.0 dated Jan. 17, 2014, with English translation (8 pgs).

Partial Translation of Japanese Office Action issued in corresponding Japanese Patent Appln. Serial No. 2010-167766 with Japanese Action, dated Mar. 18, 2014 (9 pgs).

Extended European Search Report (no translation) issued in related application No. 10171094.5, dated Apr. 16, 2013 (7 pgs).

* cited by examiner

CUTTING DEVICE AND CUTTING METHOD FOR CUTTING LABELS, AND LABELLING APPARATUS

BACKGROUND OF THE INVENTION

The invention relates to a cutting device and a cutting method for cutting labels, and also to a labelling apparatus which is equipped with this cutting device.

A labelling apparatus is used to provide objects, such as bottles, tins, etc., with a label. To this end, in the labelling apparatus, labels are cut by means of a cutting device from a label roll which is provided with a plurality of labels arranged one behind the other in the direction of rolling and unrolling of the endless roll, and then are applied to the objects that are to be labelled.

Cutting devices for cutting labels are known from EP 2 042 437 A1 or DE 20 2005 002 793 U1. The cutting devices comprise a rotating vacuum roller and a rotating cutting element. The cutting element has on its circumference at least one cutting tool which is preferably a cutting blade but may also be a punching tool. The labels are passed over the vacuum roller and are held on the latter by a vacuum being applied by the vacuum roller via openings which are located in the roller surface of the vacuum roller, so that the cutting element can cut the labels in a controlled manner. To this end, the vacuum roller also has counter-cutting bars, on which the label roll rests during the cutting process and with which the cutting blade can be brought into contact for the purpose of cutting through the endless roll of labels. The counter-cutting bars are formed by metal bars. The process of cutting the label or the endless roll of labels is carried out by the contact between the cutting blade and the counter-cutting bar. The metal bars are preferably incorporated in the vacuum roller in such a way that they do not protrude from the roller surface.

Furthermore, for the rotating cutting element, often at least two cutting blades are provided for cutting through the label, since in this way the rotational speed of the cutting element can be reduced while maintaining the same performance of the labelling apparatus. This is because, in the case of more than two cutting blades, the cutting element need not perform a 360° rotation from one label cut to the next, but rather in the case of two cutting blades only a rotation of 180° is required, and in the case of four cutting blades only a rotation of 90° degrees is required.

Also present on the rotating vacuum roller are preferably at least two counter-cutting bars, at which the cutting blade can make the cut through the label roll. There may also be provided for example three or four counter-cutting bars at an equal spacing from one another or at different spacings from one another. Also possible for example is an arrangement of the counter-cutting bars in which the counter-cutting bars are in each case at a spacing of 60° from one another.

In this prior art, however, there is the problem that, in the case of a label length which is unfavourable for the dimensions of the respective vacuum roller, the start of the label rests precisely on a counter-cutting bar and cannot be held by vacuum. According to the applicant's internal prior art, this leads to the situation whereby this counter-cutting bar must be removed and a suitable bar with openings must be inserted into the cutout for the counter-cutting bar in the vacuum roller, in order to generate a vacuum at the location of the bar via the openings by means of the vacuum roller. Such bars with openings must currently be produced by the user of the labelling machine or cutting device itself, but this is difficult since the openings must be made at an angle to the surface of the bar and a drill used to create the openings for example can easily break. If, in the case of a vacuum roller modified in this way, a cutting of the label roll is to take place later once again at the location at which the modified bar has been installed, then at present the modified bar must be removed again and the original counter-cutting bar must be installed.

It is therefore clear that, depending on the length of the labels, a considerable modification effort is required by the user of the labelling machine or cutting device, which proves to be disadvantageous due to time and cost aspects during the labelling of objects.

Furthermore, the described replacement of the original counter-cutting bar with a bar provided with openings is not possible on newer cutting devices since the newer cutting devices demand manufacturing tolerances which cannot be adhered to in the event of removal and reinstallation of the original counter-cutting bar by the user. On newer cutting devices, the user therefore cannot make do with the previously described modification of the labelling apparatus, so that the newer cutting device cannot be used in the case of a label length which is unfavourable for the dimensions of the respective vacuum roller.

It has also already been considered to alter the vacuum rollers so that more openings or vacuum openings are present in the roller surface of the vacuum roller. In other words, it has been considered to arrange the rows of openings or vacuum openings, which are arranged in rows perpendicular to the axis of the vacuum roller, with a closer hole spacing from one row of vacuum openings to another in the vacuum roller. However, the more openings present in the vacuum roller, the longer the time taken to clean the cutting device, which results in a longer downtime of the machine. Furthermore, in such a variant, it is impossible to solve the problem that, in the case of an unfavourable label length, the start of the label rests precisely on the counter-cutting bar or next to a vacuum opening.

SUMMARY OF THE INVENTION

The object of the invention is therefore to provide a cutting device and a cutting method for cutting labels and also a labelling apparatus, with which labels of any length can be cut without any complicated modification of the cutting device and/or reduction in throughput of the cutting device and thus of the labelling apparatus.

The cutting device comprises a cutting element and a counter-pressure roller. The cutting element serves for cutting into individual labels a label strip that is provided with a plurality of labels arranged one behind the other in the direction of the length of the label strip, wherein the cutting element has a cutting tool parallel to a first axis, about which the cutting element is rotatable. The counter-pressure roller serves for the placement of the label strip, wherein the counter-pressure roller is rotatable about a second axis arranged parallel to the first axis and has at least one counter-cutting bar which is provided on the outer surface of the counter-pressure roller essentially parallel to the second axis. The at least one counter-cutting bar has a width perpendicular to the second axis which is smaller than the length of the counter-cutting bar parallel to the second axis. Moreover, the at least one counter-cutting bar has a width such that the cutting position, at which the cutting element makes contact with the counter-cutting bar when cutting the label, can be shifted on the counter-cutting bar.

The labelling apparatus comprises such a cutting device and serves for applying the labels cut by the cutting device to objects that are to be provided with labels.

In particular, the altered width of the counter-cutting bar on the cutting device is in contrast to the previous approach of keeping the counter-cutting bar as narrow as possible in order to minimise the production costs.

BRIEF SUMMARY OF THE DRAWINGS

Preferably, the counter-pressure roller has a large number of openings in the outer surface of the counter-pressure roller for generating a vacuum in the counter-pressure roller when the openings are at least partially covered by the label strip. In this case, the openings in the counter-pressure roller are advantageously arranged in a plurality of rows arranged parallel to one another which are arranged essentially perpendicular to the counter-cutting bars on the surface of the counter-pressure roller. However, the arrangement of these openings could also be configured differently, for example in the form of rows which are not exactly parallel.

DETAILED DESCRIPTION OF THE INVENTION

Figure 1:
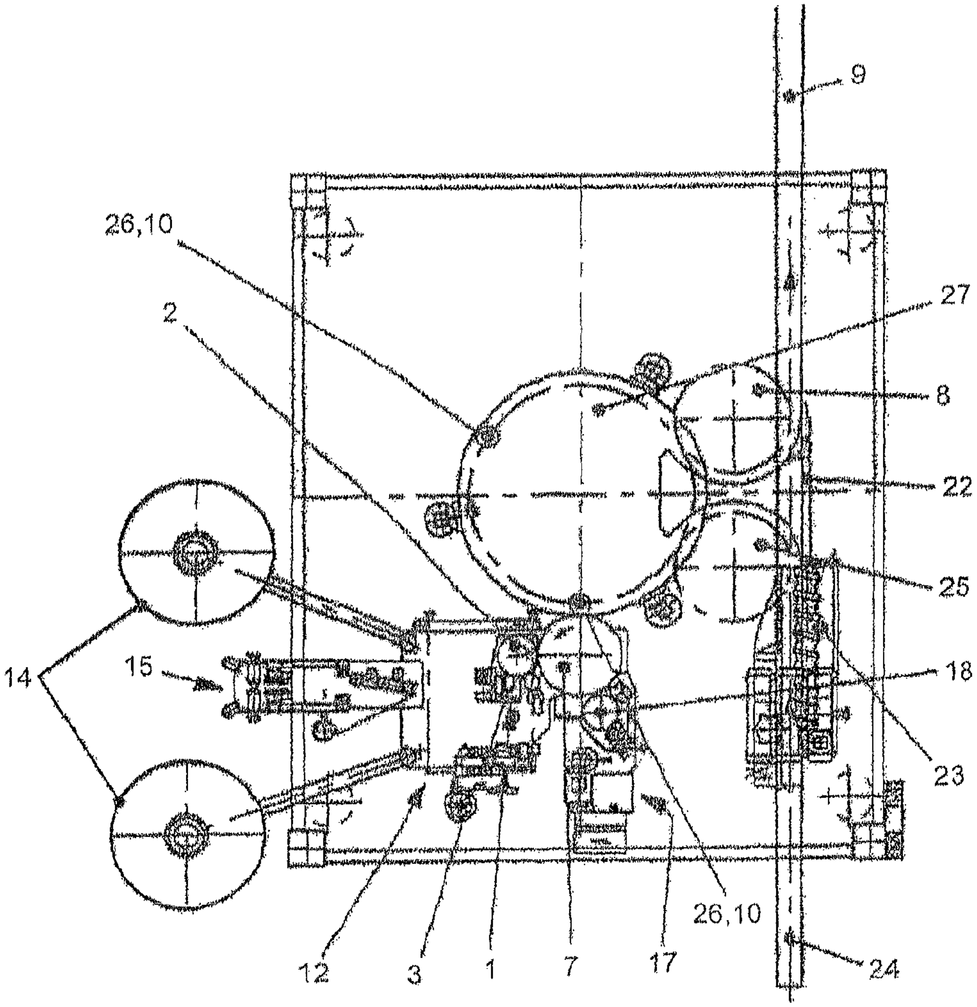

It is advantageous if at least one of the at least one counter-cutting bar has a plurality of openings which are in communication with openings in the surface of the counter-pressure roller in such a way that a label strip resting on the counter-cutting bar is held against the counter-cutting bar when a vacuum is generated by the counter-pressure roller.

In this case, the plurality of openings of the counter-cutting bar may be arranged in a row along the length of the counter-cutting bar and essentially in the middle of the width of the counter-cutting bar.

Preferably, the cutting device is designed in such a way that the cutting position can be shifted on the counter-cutting bar so that the start of a label on the label strip can be placed in such a way that the plurality of openings is arranged in the outer region of the label.

The cutting device may also be designed in such a way that it is controllable by a control device which is designed to shift the cutting position on the counter-cutting bar in such a way that it offsets the rotary position of the counter-pressure roller and cutting element relative to one another from a starting rotary position, in which a cutting tool upon making contact with a counter-cutting bar of the counter-pressure roller always strikes a predefined position on the width of the counter-cutting bar, into a different rotary position relative to one another.

The cutting position may be able to be shifted by a drive device which is designed to at least temporarily change a circumferential speed of at least one rotating element, which is the cutting element or the counter-pressure roller, relative to the respective other rotating element.

The cutting position may also able to be shifted by a drive device which is designed to at least temporarily slow or accelerate the circumferential speed of the cutting element relative to the circumferential speed of the counter-pressure roller.

Furthermore, the cutting position may be able to be shifted by a drive device which is designed to at least temporarily slow or accelerate the circumferential speed of the counter-pressure roller relative to the circumferential speed of the cutting element.

It is moreover possible to shift the cutting position by a drive device which is designed to at least temporarily change the feed speed of the label strip relative to the circumferential speed of the counter-pressure roller and/or the circumferential speed of the cutting element.

The counter-cutting bar may preferably have a width of 5-20 mm, preferably 13 to 14 mm.

The cutting method serves for cutting labels using a cutting element which cuts into individual labels a label strip that is provided with a plurality of labels arranged one behind the other in the direction of the length of the label strip, wherein the cutting element has a cutting tool parallel to a first axis, about which the cutting element is rotated, and wherein the cutting tool, when cutting the label strip, makes contact with a counter-cutting bar of a counter-pressure roller on which the label strip is placed, wherein the counter-pressure roller is rotated about a second axis arranged parallel to the first axis and has at least one counter-cutting bar which is provided on the outer surface of the counter-pressure roller essentially parallel to the second axis and preferably in the second axis, wherein the at least one counter-cutting bar has a width perpendicular to the second axis which is smaller than the length of the counter-cutting bar parallel to the second axis. In this case the cutting position, at which the cutting element makes contact with the counter-cutting bar when cutting the label, is shifted on the width of the counter-cutting bar prior to cutting the label strip into individual labels.

By virtue of the counter-cutting bars, which are wider than in the prior art, the entire area of the counter-cutting bar can be used to “cut” or separate the label from the label strip. By shifting the cutting position on the counter-cutting bar, as described above, a secure hold of the start of the label is always ensured. Furthermore, the changeover time and thus the downtime of a labelling apparatus equipped with the described cutting device can be reduced. Cost and time savings are possible as a result.

Figure 2:
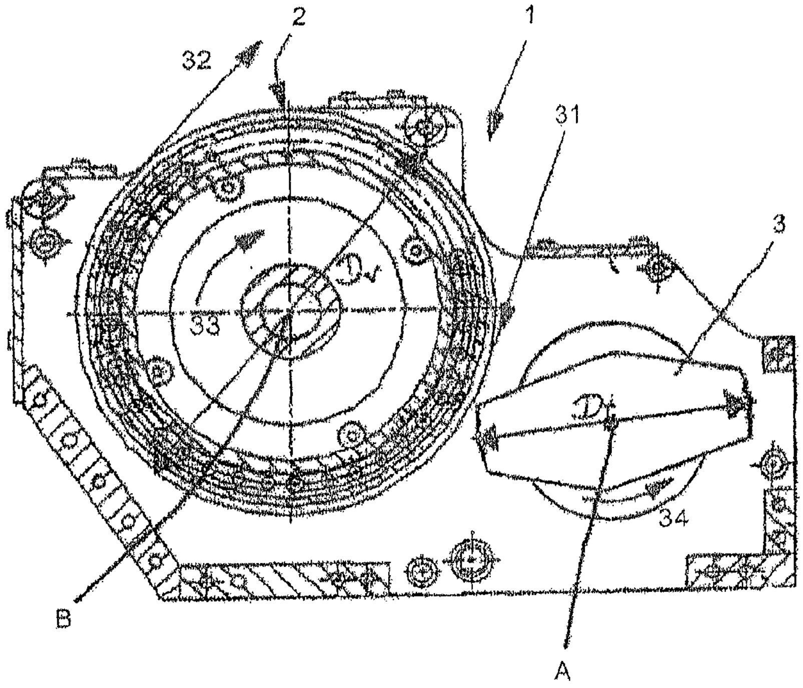
Figure 3:
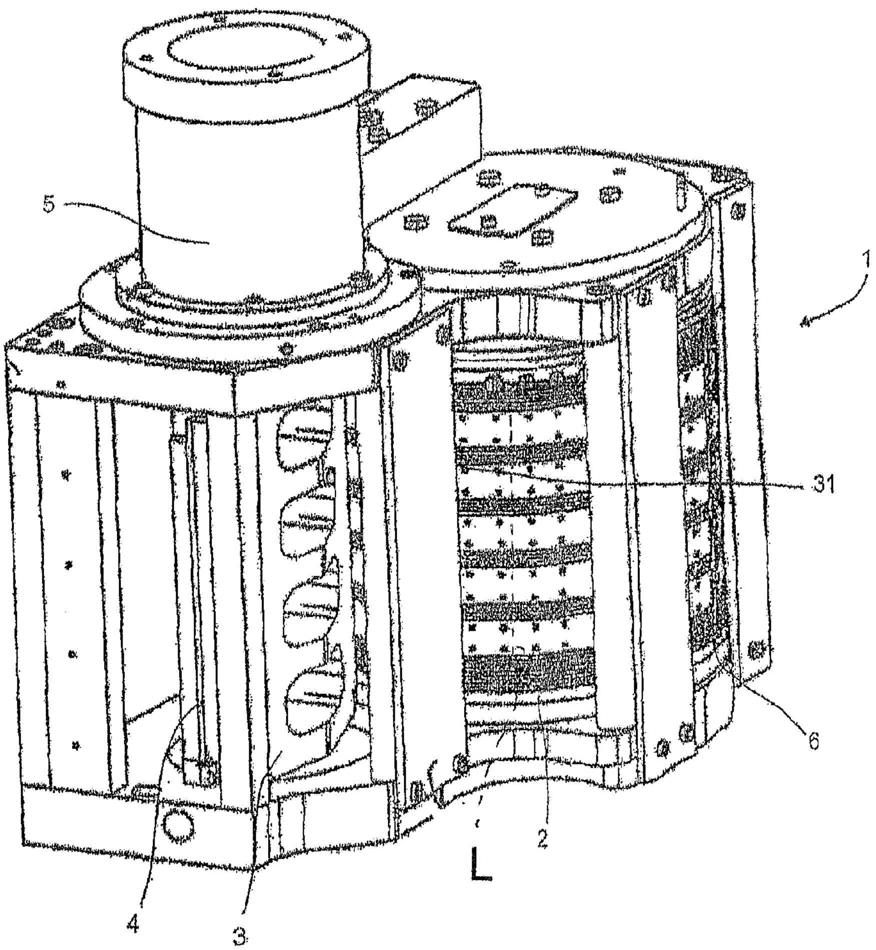
Figure 4:
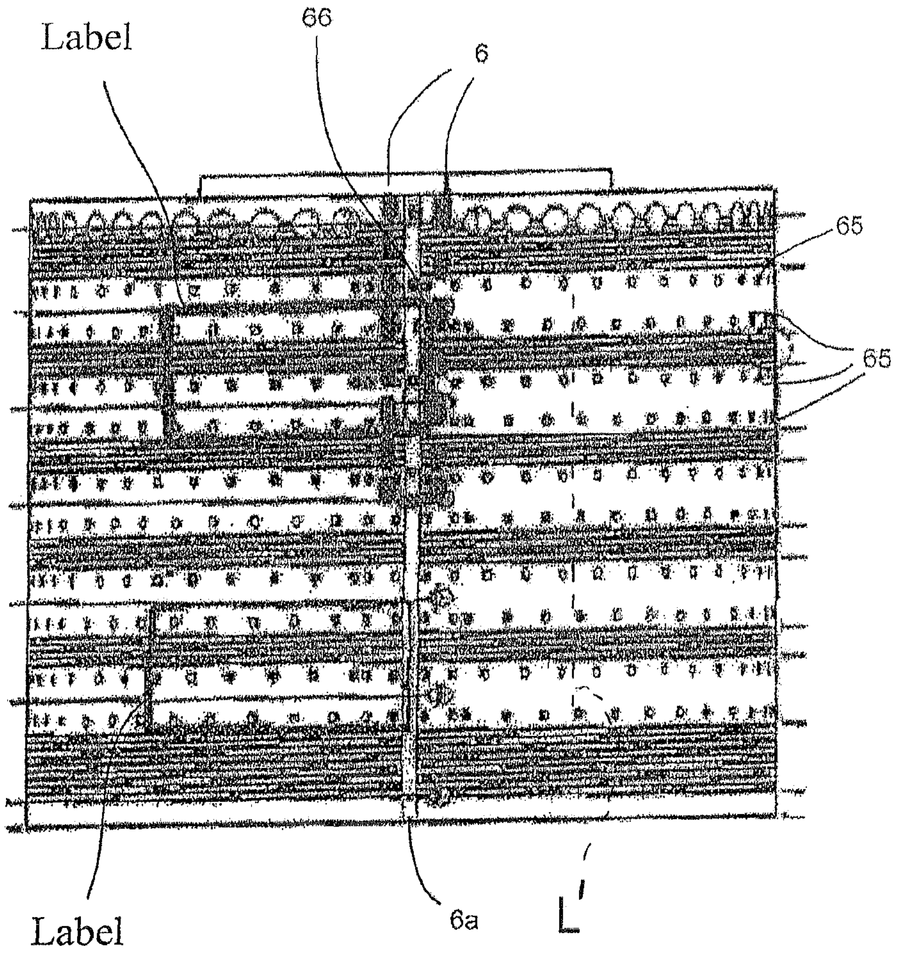
Figure 5:
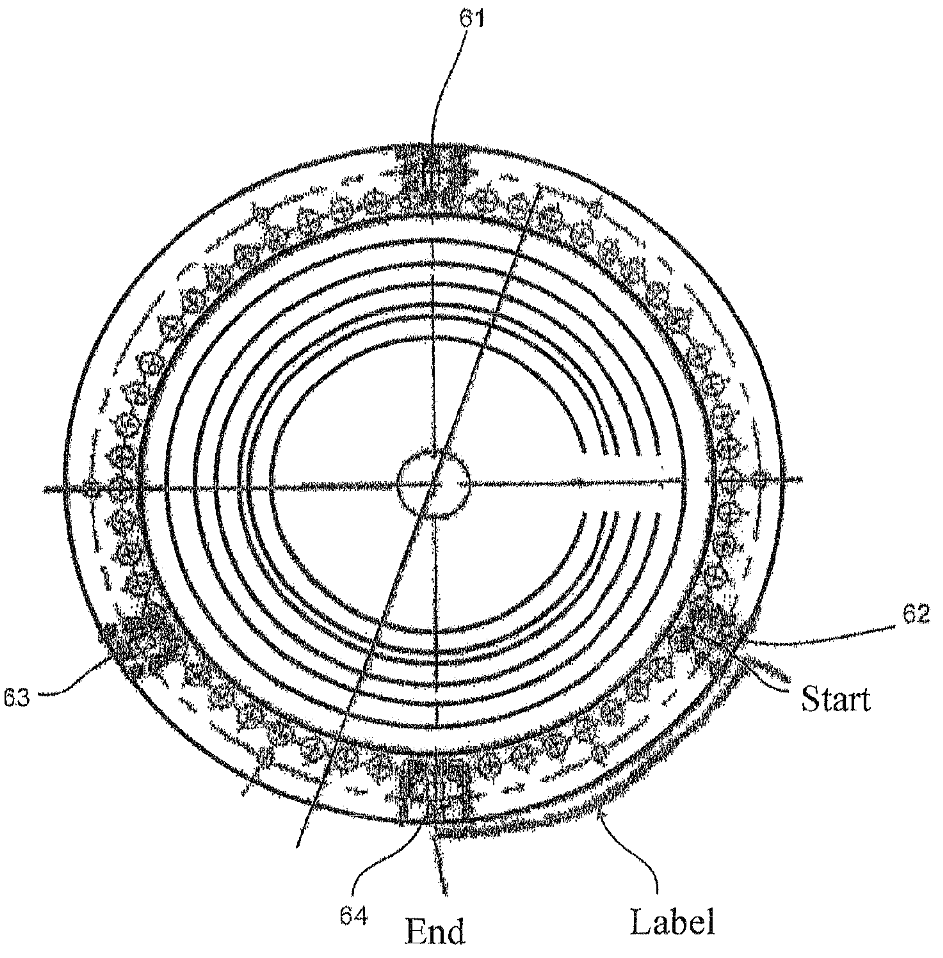

The invention will be described in more detail below with reference to the appended drawing and on the basis of examples of embodiments. In the drawing:

FIG. 1 shows a schematic plan view of a labelling machine;

FIG. 2 shows a schematic plan view of a cutting device of such a labelling machine;

FIG. 3 shows a schematic perspective view of the cutting device;

FIG. 4 shows a three-dimensional view of a counter-pressure roller of the cutting device; and FIG. 5 shows a schematic plan view of the counter-pressure roller of the cutting device.

First Example of Embodiment

FIG. 1 shows a schematic plan view of a labelling machine which allows a continuous high-power application of wrap-around labels to bottles 10 which are continuously supplied in a single-file row.

The labelling machine has a feed conveyor 24, an inlet starwheel 25 with an upstream infeed worm 23, a guide curve 22, a carousel 27 with a plurality of rotating plates 26 arranged at equal spacings on a common pitch circle, an outlet starwheel 8 and an outlet conveyor 9. Said transport elements, which move the bottles 10 through the machine, can be continuously driven in a manner synchronous with one another with regard to speed and position.

In the circulating region between the inlet starwheel 25 and the outlet starwheel 8, there is located on the outer periphery of the carousel 27 a labelling unit 12 for applying wrap-around labels. The labelling unit 12 has two label roll holders 14 with a splicing station 15 located therebetween, a cutting device 1, a gluing unit 17 and a gripper cylinder 7 for transferring a pre-cut label, to which glue has been applied on its leading and trailing edge, to a bottle 10 running past.

The process of labelling a bottle 10 using the labelling machine of FIG. 1 proceeds essentially as follows.

A bottle 10 introduced by the feed conveyor 24 is fed in the correct position in conjunction with the laterally arranged infeed worm 23 into the inlet starwheel 25 and is transferred by the latter, in collaboration with the opposite guide curve 22, in a continuous movement onto a rotating plate 26 of the rotating carousel 27. There, the bottle 10 is clamped axially on the rotating plate 26 in a manner such as to rotate therewith by means of a centering bell (not shown) which is controlled relative to the rotating plate 26 and which can be raised and lowered, and is brought tangentially by the circulating movement of the carousel 27 to the gripper cylinder 17 of the labelling unit 12.

Temporally in parallel therewith, the label strip is drawn from a label strip roll 14 in a controlled manner and is moved past a sensor (not shown) which detects printed marks or a printed image, and is cut in the cutting device 1 connected to the sensor according to the printed image or cutting marks. The cut label, which during the cutting process is located with the printed image outwards on a rotating counter-pressure roller 2, is transferred after the cutting process to the vacuum-operated gripper cylinder 7, from where it is moved past the gluing roller 18 with its rear side facing outwards and is provided with a strip of glue at the start and at the end. This label provided with the strip of glue at the start and at the end is fed tangentially to the carousel 27, on which the bottles 10 are located. The strip of glue at the start is brought into contact with the bottle 10 and the label is wrapped around by rotating the bottle 10 about its own axis, wherein the strip of glue at the end is glued to the start of the label either in an overlapping manner or end to end. The described application of the label takes place during a continuous forward movement of the carousel 27.

After passing through the labelling unit 12 and after the end of the wrap-around process, the labelled bottle 10 reaches the outlet starwheel 8 and is transferred to the outlet conveyor 9.

FIG. 2 shows a detail view of the cutting device 1 of the labelling unit 12. The label strip which is drawn from the label strip roll 14 is fed tangentially to the counter-pressure roller 2 of the cutting device 1 in the direction of the arrow 31 and is guided away by the latter in the direction of the arrow 32. The circumferential speed of the rotating counter-pressure roller 2 is identical to the feed speed of the label strip, so that the transport of the label strip on the counter-pressure roller 2 takes place via friction without slip. A sensor (not shown) for detecting a printed image or cutting marks senses the label strip with regard to the locations to be cut and forwards its information directly to the drive unit of the cutting element 3 and/or the counter-pressure roller 2. A programme control can determine the time of cutting and can thus set the circumferential speed of the cutting element 3 about a first axis A and/or the circumferential speed of the counter-pressure roller 2 about a second axis B. In doing so, account is taken of the fact that the circumferential speed of the cutting tool 4 in the rotating cutting element 3 is identical to the circumferential speed of the counter-pressure roller 2 and thus also the transport speed of the label strip.

FIG. 3 shows a perspective view of the cutting device 1 of the labelling unit 12. The label strip to be cut is fed to the counter-pressure roller 2 in the direction of the arrow 31. The counter-pressure roller 2 and the cutting element 3 are driven by their own drive devices (only the motor drive device 5 of the cutting element 3 being shown here) in such a way that the cutting tool 4 comes into engagement with the counter-element 6 on the counter-pressure roller 2 at the time of cutting through the label, wherein at this moment the circumferential speed of the cutting element 3 and that of the counter-pressure roller 2 are identical. The cutting tool 4 is spring-mounted in the cutting element 3 in order to be able to make the cut when in engagement with the counter-element 6 in a manner that causes little wear on the cutting tool and is gentle on the label. The counter-element 6 is also referred to below as the counter-cutting bar 6.

As shown in FIG. 3, the counter-pressure roller 2 has a large number of openings 65 which are arranged one behind the other in rows around the circumference of the counter-pressure roller 2. A plurality of such rows are arranged parallel to one another and at a predefined distance from one another on the counter-pressure roller 2. Here, the rows of openings 65 are arranged in such a way that the openings 65 of two adjacent rows lie essentially on an imaginary line L which is perpendicular to the row of openings 65, that is to say perpendicular to the axis of rotation B of the counter-pressure roller 2. Through the openings 65, a negative pressure or a vacuum can be generated on the roller surface or outer surface of the counter-pressure roller 2, so that a label strip resting on the counter-pressure roller 2 is sucked against the counter-pressure roller 2 and is then thus by the counter-pressure roller 2.

The arrangement of the rows of openings 65 is also selectable, as shown in FIG. 4. That is to say that rows of openings 65 may be arranged in such a way that the openings 65 of two adjacent rows do not lie on an imaginary line L' which is perpendicular to the row of openings 65, that is to say perpendicular to the rotation axis B of the counter-pressure roller 2. In other words, openings 65 of two adjacent rows are offset relative to one another, as shown in FIG. 4. In this case, the openings 65 of two adjacent rows in the vicinity of a counter-cutting bar 6 are arranged essentially on a line which is perpendicular to the row of openings 65, that is to say perpendicular to the rotation axis B of the counter-pressure roller 2. In FIG. 4, these are the two openings 65 arranged closest to the counter-cutting bar 6 on the right-hand and left-hand side of the counter-cutting bar 6.

FIG. 4 shows two different widths of the counter-cutting bar 6 at one mounting location of the counter-cutting bar 6 for the purpose of better illustrating the difference between a counter-cutting bar 6a of the prior art and the counter-cutting bar 6 according to the present example of embodiment.

The lower counter-cutting bar 6a in FIG. 4, the counter-cutting bar 6a of the prior art, is narrower than the counter-cutting bar 6 according to the present example of embodiment, which is marked by thick dashed lines. For this reason, the start of the label, which is located to the left of the counter-cutting bar 6a, can be located on the rows of offset openings 65 in such a way that the start of the label can be held only in the middle region of the label, while the outer region, that is to say the edge region of the start of the label, rests "loosely".

The upper counter-cutting bar 6 in FIG. 4, the counter-cutting bar 6 according to the present example of embodiment, is wider than the counter-cutting bar 6a of the prior art. As a result, the start of the label can be placed in such a way that openings 66 in the counter-cutting bar 6 lie in the outer region, that is to say the edge region, of the start of the label. In this way, a greater width of the counter-cutting bar 6 can be used for cutting the label or label strip, and the edge region of the start of the label can also be held securely against the counter-pressure roller 2. That is to say that, according to the present example of embodiment, the cutting position at which the cutting element 3 makes contact with the counter-cutting bar 6 during cutting of the label can be shifted on the counter-cutting bar 6 since the counter-cutting bar 6 is wider than the counter-cutting bar 6a of the prior art.

In FIG. 4, the counter-cutting bar 6a is designed as a counter-cutting bar which has a width of approx. 7 mm, while the counter-cutting bar 6 is designed as a counter-cutting bar 6 having a width of approx. 13 to 14 mm. That is to say that the counter-cutting bar 6 has approximately twice the width of the counter-cutting bar 6*a*. Moreover, the openings 66 in the counter-cutting bar 6 are designed in such a way that the openings 66 in the counter-cutting bar 6 are located over the openings 65 in the surface of the counter-pressure roller 2. As a result, the openings 65 and 66 are in communication so that a label strip resting on the counter-cutting bar 6 can be held against the counter-cutting bar 6 when a vacuum is generated by the counter-pressure roller 2. As can be seen from FIG. 4, the openings 66 in the counter-cutting bar 6 are arranged in a row along the length of the counter-cutting bar 6 and in the middle of the width of the counter-cutting bar 6.

It should be pointed out that the counter-cutting bar 6 is usually present over the entire width of the counter-pressure roller 22 and not only over half the width of the counter-pressure roller 2 as shown in FIG. 4 for the purpose of illustrating the difference between the counter-cutting bars 6 and 6*a*.

FIG. 5 shows a schematic plan view of a counter-pressure roller 2, wherein the counter-cutting bars 61, 62, 63 and are incorporated in the outer surface of the counter-pressure roller 2 parallel to the second rotation axis B, that is to say the rotation axis of the counter-pressure roller 2. The spacing of the counter-cutting bars 61, 62 and 63 relative to one another is selected in such a way that they are respectively offset by an angle of 120° around the circumference of the counter-pressure roller 2. The fourth counter-cutting bar 64 is likewise incorporated parallel to the second rotation axis B in the outer surface of the counter-pressure roller 2, but the fourth counter-cutting bar 64 is offset by an angle of 180° around the circumference of the counter-pressure roller 2 relative to the counter-cutting bar 61. With this arrangement of the counter-cutting bars 61 to 64, it is possible to produce label lengths which correspond to the entire circumference, three-quarters of the circumference, half the circumference and one-third of the circumference of the counter-pressure roller 2. With this one counter-pressure roller 2 and the counter-cutting bars 61 to 64 incorporated therein, differently structured gripper cylinders 7 can be loaded. The loadable gripper cylinders 7 may be cylinders which can pick up either two labels corresponding to the circumference of the counter-pressure roller 2 or three labels corresponding to two-thirds of the circumference of the counter-pressure roller 2 or four labels corresponding to half the circumference of the counter-pressure roller 2 or six labels corresponding to one-third of the circumference of the counter-pressure roller 2.

In FIG. 5, the different widths of approx. 7 mm and approx. 13 to 14 mm are shown for each counter-cutting bar 61, 62, 63 and 64, and a label with a start and end is shown on the counter-pressure roller 2 in order to illustrate the position of the label on the bars of different width. The narrow design of the counter-cutting bars 61, 62, 63 and 64 according to the counter-cutting bar 6*a* of FIG. 4 is denoted by an asterisk, i.e., an * in FIG. 5, whereas the wider design of the counter-cutting bars 61, 62, 63 and 64 according to the counter-cutting bar 6 of FIG. 4, and thus according to the present example of embodiment, is shown by dotted lines in FIG. 5.

The shifting of the cutting position on the counter-cutting bar 6 or the counter-cutting bars 61, 62, 63 and 64, that is to say on the counter-cutting bar according to the present example of embodiment having a width of approx. 12 to 18 mm and preferably 13 to 14 mm, can be shifted by means of a control device (not shown) which controls the cutting device 1. That is to say that the control device can control the rotary position of the counter-pressure roller 2 and cutting element 3 relative to one another. More specifically, the rotary position of the counter-pressure roller 2 and cutting element 3 relative to one another is set in a starting position of the cutting device in such a way that a cutting tool 4 of the cutting element 3, upon making contact with a counter-cutting bar 6, always strikes a predefined position on the width of the counter-cutting bar 6.

According to this example of embodiment, the control device can actuate the cutting device 1 in such a way that, relative to this starting position of the cutting device 1, an offset of the rotary position of the counter-pressure roller 2 relative to the rotary position of the cutting element 3 is obtained.

This offset may be achieved by a corresponding actuation of the servo drive devices of the counter-pressure roller 2 and of the cutting element 3 by the control device.

It is also possible to actuate the rotational movement of the counter-pressure roller 2 and of the cutting element 3 in a temporally offset manner, that is to say temporally one after the other, so that the cutting element 3 is somewhat offset relative to the counter-pressure roller 2 compared to the conventional cutting device 1. The control device may carry out the control of the counter-pressure roller 2 temporally after the cutting element 3, or it may also carry out the control of the cutting element 3 temporally after the counter-pressure roller 2. That is to say that the cutting position, at which the cutting element makes contact with the counter-cutting bar 6 during cutting of the label, is shifted in the direction of the width of the counter-cutting bar 6 prior to cutting a label from the label strip.

In this way, in the present example of embodiment, the cutting position of the label is no longer located at the predefined position on the width of the counter-cutting bar 6, for example in the middle of the width of the counter-cutting bar 6, but rather at a different position, that is to say in front of or behind the predefined position on the width of the counter-cutting bar 6. As a result, an offset of the cutting position on the counter-cutting bar 6 can be achieved depending on requirements, that is to say depending on the current label length.

Second Example of Embodiment

The second example of embodiment is identical to the first example of embodiment apart from the way in which the shift in the cutting position is achieved. Therefore, only the parts of the second example of embodiment which differ from the first example of embodiment will be described below. Parts which are identical and which have the same meaning are provided with identical references.

According to the second example of embodiment, the shifting of the cutting position on the counter-cutting bar 6 or the counter-cutting bars 61, 62, 63 and 64 may take place by means of the drive device 5 of the cutting element 3 or the drive device (not shown) of the counter-pressure roller 2. That is to say that one of the drive devices can at least temporarily change the circumferential speed of the element driven by it relative to the circumferential speed of the other element driven by the other drive device. In this way, an offset of the cutting position on the counter-cutting bar 6 can be achieved depending on requirements, that is to say depending on the current label length.

In particular, for example, the drive device 5 changes the circumferential speed of the cutting element 3 at least temporarily relative to the circumferential speed of the counter-pressure roller 2. However, the drive device (not shown) of the counter-pressure roller 2 may also change the circumferential speed of the counter-pressure roller 2 at least temporarily relative to the circumferential speed of the cutting element 3.

Third Example of Embodiment

The third example of embodiment is identical to the first example of embodiment apart from the way in which the shift in the cutting position is achieved. Therefore, only the parts of the third example of embodiment which differ from the first example of embodiment will be described below. Parts which are identical and which have the same meaning are provided with identical references.

According to this example of embodiment, the cutting position is shifted in that the drive device 5 temporarily slows or accelerates the circumferential speed of the cutting element 3 relative to the circumferential speed of the counter-pressure roller 2.

Fourth Example of Embodiment

The fourth example of embodiment is identical to the first example of embodiment apart from the way in which the shift in the cutting position is achieved. Therefore, only the parts of the fourth example of embodiment which differ from the first example of embodiment will be described below. Parts which are identical and which have the same meaning are provided with identical references.

According to this example of embodiment, the cutting position is shifted in that the drive device (not shown) of the counter-pressure roller 2 temporarily slows or accelerates the circumferential speed of the counter-pressure roller 2 relative to the circumferential speed of the cutting element 3.

Fifth Example of Embodiment

The fifth example of embodiment is identical to the first example of embodiment apart from the way in which the shift in the cutting position is achieved. Therefore, only the parts of the fifth example of embodiment which differ from the first example of embodiment will be described below. Parts which are identical and which have the same meaning are provided with identical references.

According to this example of embodiment, the cutting position is shifted in that the drive device (not shown) of the counter-pressure roller 2 temporarily slows or accelerates the feed speed of the label strip relative to the circumferential speed of the counter-pressure roller 2 and/or the circumferential speed of the cutting element 3.

In this case, the circumferential speed of the cutting tool in the rotating cutting element 3 may for example be identical to the circumferential speed of the counter-pressure roller 2.

However, if the circumferential speed of the counter-pressure roller 2 is not identical to the feed speed of the label strip, the transport of the label strip on the counter-pressure roller 2 no longer takes place by friction but rather with slip.

(General)

All the above-described embodiments of the cutting device and of the labelling apparatus may be used individually or in combination with one another. In particular, the following modifications are conceivable.

The configuration of the width of the counter-cutting bars 61, 62, 63 and 64 in FIG. 4 can be modified in such a way that all the counter-cutting bars 61, 62, 63 and 64 have the same width of approx. 12 to 18 mm and preferably approx. 13 to 14 mm or else just one of said bars may have a width of approx. 12 to 18 mm and preferably approx. 13 to 14 mm. Depending on requirements, the width of the counter-cutting bars 61, 62,

63 and 64 may also be greater, provided that the width of the counter-cutting bars 61, 62, 63 and 64 is smaller than the length of the counter-cutting bars 61, 62, 63 and 64 in order not to increase unnecessarily the costs of production of the counter-cutting bar(s) and thus of the cutting device.

The configuration of the cutting element 3 and of the counter-pressure roller 2 with their own drive in each case has the advantage that a cutting method which is adapted as flexibly as possible to the present situation can be used. If, for example, the cutting element 3 has two cutting tools 4 but one is no longer usable due to wear, then it is possible to rotate the cutting element 3 through 360° from one step to the next, so that the cutting tool 4 which is no longer usable is no longer used. This is advantageous since then a change of cutting element 3 or of the cutting tool 4 which is no longer usable can be performed when the machine is undergoing routine maintenance. Additional interruptions can thus be minimised to a necessary degree.

According to one preferred modification of the invention, the circumferential speeds of the cutting element 3 and of the counter-pressure roller 2, which may by all means differ during one revolution, are adapted to one another in such a way that they are identical at the time of cutting the label. That is to say that the circumferential speed of the cutting element 3 or of the counter-pressure roller 2 is temporarily slowed or accelerated relative to the circumferential speed of the other rotatable element before, but not during, the cutting of the label.

The openings 65 in the counter-pressure roller 2 and the openings 66 in the counter-cutting bar 6 may be created for example by means of a drill or by means of a punching or milling cutter. Although the openings 65 and 66 in the figures are shows as a round hole or round opening, any other type of opening which can perform the above-described function of the openings 65 in the counter-pressure roller and the openings 66 in the counter-cutting bar 6 is suitable, such as for example an elongate hole, a triangular opening, a star-shaped opening, etc.

In the case of a counter-pressure roller 2 which has a plurality of counter-cutting bars 6, not all the counter-cutting bars 6 need have openings 66. However, it is advantageous if the counter-cutting bars 6 are incorporated in the outer surface of the counter-pressure roller 2 in such a way that they do not protrude from the roller surface, and the outer surface of the counter-pressure roller 2 even with the incorporated counter-cutting bars 6 has a flat outer surface.

LIST OF REFERENCES

1 cutting device
2 counter-pressure roller
3 cutting element
4 cutting tool
5 drive device of the cutting element
6 counter-element or counter-cutting bar
7 gripper cylinder
8 outlet starwheel
9 outlet conveyor
10 bottles
12 labelling unit
14 label roll holders
15 splicing station
17 gluing unit
18 gluing roller
22 guide curve
23 infeed worm
24 feed conveyor

25 inlet starwheel
26 rotating plate
27 carousel
31 arrow
32 arrow
61, 62, 63, 64 counter-cutting bars
65 openings in the counter-pressure roller
66 openings in the counter-cutting bar
A first axis
B second axis

The invention claimed is:

1. A cutting device for cutting labels, the labels serving for labeling bottles or cans, comprising a cutting element for cutting into individual labels a label strip that is provided with a plurality of labels arranged one behind the other in a direction of a length of the label strip, wherein the cutting element has a cutting tool parallel to a first axis, about which the cutting element is rotatable, a counter-pressure roller for placement of the label strip, wherein the counter-pressure roller is rotatable about a second axis arranged parallel to the first axis and has at least one counter-cutting bar which is provided on an outer surface of the counter-pressure roller parallel to the second axis, wherein the at least one counter-cutting bar has a width in a peripheral direction of the counter-pressure roller which is smaller than a length of the counter-cutting bar parallel to the second axis, wherein said cutting bar width is such that a cutting position, at which the cutting element makes contact with the counter-cutting bar when cutting the label, is able to be shifted on the counter-cutting bar with respect to the width of the counter-cutting bar, wherein at least one of the at least one counter-cutting bar has a plurality of openings which are in communication with openings in the outer surface of the counter-pressure roller such that a label strip resting on the counter-cutting bar is held against the counter-cutting bar when a vacuum is generated within the counter-pressure-roller, wherein the counter-cutting bars are incorporated in the outer surface of the counter-pressure roller such that they do not protrude from the roller surface, and wherein the entire area of the counter-cutting bar can be used to cut or separate a label from the label strip.

2. The cutting device according to claim 1, wherein the counter-pressure roller has a large number of openings in an outer surface of the counter-pressure roller for generating a vacuum in the counter-pressure roller when the openings are at least partially covered by the label strip, and the openings in the counter-pressure roller are arranged in a plurality of rows arranged in a plurality of rows arranged parallel to one another which are arranged perpendicular to the counter-cutting bars on the outer surface of the counter-pressure roller.

3. The cutting device according to claim 2, wherein the openings are related from the group consisting of round holes, elongate holes, triangular openings, and star-shaped openings.

4. The cutting device according to claim 1, wherein the cutting device is designed in such a way that the cutting position is able to be shifted on the counter-cutting bar so that the start of a label on the label strip can be placed such that the plurality of openings is arranged in an outer region of the label.

5. The cutting device according to claim 1, wherein the cutting device is designed in such a way that the cutting device is controllable by a control device which is designed to shift the cutting position on the counter-cutting bar in such a way that the cutting device offsets a rotary position of the counter-pressure roller and cutting element relative to one another from a starting rotary position, in which a cutting tool upon making contact with a counter-cutting bar of the counter-pressure roller always strikes a predefined position on the width of the counter-cutting bar, into a different rotary position relative to one another.

6. The cutting device according to claim 1, wherein the cutting position is able to be shifted by a drive device which is designed to at least temporarily change a circumferential speed of at least one rotating element, which is the cutting element or the counter-pressure roller, relative to the respective other rotating element.

7. The cutting device according to claim 1, wherein the counter-cutting bar has a width of 5 to 20 mm.

8. The cutting device according to claim 7, wherein the counter-cutting bar has a width of 13 to 14 mm.

9. A labelling apparatus comprising a cutting device as claimed according to claim 1, and a device for applying the labels cut by the cutting device to objects that are to be provided with labels.

10. The cutting device according to claim 1, wherein the counter-pressure roller has a large number of openings in an outer surface of the counter-pressure roller for generating a vacuum in the counter-pressure roller when the openings are at least partially covered by the label strip, and the openings in the counter-pressure roller are arranged in a plurality of rows, which are arranged in such a way that the openings of two adjacent rows do not lie on a line which is perpendicular to the row of openings.

11. The cutting device according to claim 1, wherein the outer surface of the counter-pressure roller even with the at least one counter-cutting bar has a flat outer surface.

12. The cutting device according to claim 1, wherein the cutting position, at which the cutting element makes contact with the counter-cutting bar when cutting the label, is shiftable on the counter-cutting bar with respect to the width of the counter-cutting bar depending on label length.

13. The cutting device according to claim 1, wherein the width of the at least one counter-cutting bar in a peripheral direction of the counter-pressure roll is of a width such that the start of the label can be placed in such a way that openings in the counter-cutting bar lie on an edge region of the start of the label.

14. A cutting device for cutting labels, the labels serving for labeling bottles or cans, comprising a cutting element for cutting into individual labels a label strip that is provided with a plurality of labels arranged one behind the other in a direction of a length of the label strip, wherein the cutting element has a cutting tool parallel to a first axis, about which the cutting element is rotatable, a counter-pressure roller for placement of the label strip, wherein the counter-pressure roller is rotatable about a second axis arranged parallel to the first axis and has at least one counter-cutting bar which is provided on an outer surface of the counter-pressure roller parallel to the second axis, wherein the at least one counter-cutting bar has a width in a peripheral direction of the counter-pressure roller which is smaller than a length of the counter-cutting bar parallel to the second axis, wherein said width is such that at a cutting position, at which the cutting element makes contact with the counter-cutting bar when cutting the label, the cutting element is able to be shifted on the counter-cutting bar with respect to the width of the counter-cutting bar, wherein at least one of the at least one counter-cutting bar has a plurality of openings which are in communication with openings in the outer surface of the counter-pressure roller such that a label strip resting on the counter-cutting bar is held against the counter-cutting bar when a vacuum is generated within the counter-pressure-roller, wherein the counter-cutting bars are incorporated in the outer surface of the counter-pressure roller such that they do not protrude from the roller surface, and wherein the entire area of the counter-cutting bar can be used to cut or separate a label from the label strip.

* * * * *